United States Patent [19]

Springston

[11] Patent Number: 5,680,099
[45] Date of Patent: Oct. 21, 1997

[54] VEHICLE STEERING DISPLAY-CONTROLLER

[75] Inventor: Eric Douglas Springston, Greene, N.Y.

[73] Assignee: The Raymond Corporation, Greene, N.Y.

[21] Appl. No.: 497,368

[22] Filed: Jun. 30, 1995

[51] Int. Cl.[6] .................................................. B60Q 1/00
[52] U.S. Cl. ...................... 340/461; 340/691; 364/424.07
[58] Field of Search ................................ 340/686, 691, 340/980, 461, 462, 465, 525, 671, 672; 364/424.01, 424.05, 424.07, 424.1, 434; 280/92; 345/7; 359/630, 13

[56] References Cited

U.S. PATENT DOCUMENTS

| | | | |
|---|---|---|---|
| 2,672,597 | 3/1954 | Ritch, Jr. | 340/438 |
| 3,103,909 | 9/1963 | Anderson | 116/31 |
| 3,673,561 | 6/1972 | Bronstein | 340/438 |
| 3,900,831 | 8/1975 | Houseman et al. | 340/459 |
| 4,092,716 | 5/1978 | Berg et al. | 364/424.01 |
| 4,172,638 | 10/1979 | Freedman | 359/863 |
| 4,175,638 | 11/1979 | Christensen | 180/415 |
| 4,417,230 | 11/1983 | Fachini et al. | 340/438 |
| 4,436,374 | 3/1984 | Krueger | 359/850 |
| 4,696,486 | 9/1987 | Ruhter | 280/400 |
| 4,728,923 | 3/1988 | Finger | 340/438 |
| 4,893,689 | 1/1990 | Laurich-Trost | 180/414 |
| 5,194,851 | 3/1993 | Kraning et al. | 340/686 |
| 5,229,746 | 7/1993 | Healy et al. | 340/461 X |
| 5,325,935 | 7/1994 | Hirooka et al. | 364/424.05 X |

*Primary Examiner*—Thomas Mullen
*Attorney, Agent, or Firm*—Quarles & Brady

[57] ABSTRACT

A steerable vehicle having front and rear wheels is provided with a visual display for indicating the directional position of the wheels. The visual display, which is transparent, is vertically mounted on the vehicle within the normal forward view of the operator, enabling the operator to simultaneously view the display and maintain an unobstructed forward view. The visual display, which includes a transparent circuit card and an array of light emitting diodes (LEDs), may be mounted on the transparent mast guard of a forklift vehicle. A steering controller for a wheeled vehicle having a steerable drive wheel includes a computer containing reference data for the allowable range of the drive wheel directional position relative to the position of a second wheel, a switch coupled to the computer for selecting the directional position of the second wheel, and a transparent visual display coupled to the computer for indicating the position of the wheels. The display, which includes a transparent circuit card and an LED array, is vertically mounted on the vehicle within the operator's normal forward field of view. The controller provides for a visual signal to the operator when the directional position of the drive wheel approaches the limit of its allowable range and further provides for vehicle traction to cease when the position of the drive wheel transgresses its allowable range.

27 Claims, 5 Drawing Sheets

VEHICLE STEERING DISPLAY-CONTROLLER

FIELD OF THE INVENTION

This invention relates to vehicle steering displays and controllers, and more particularly to a steerable wheeled vehicle provided with a visual display that indicates the directional position of its wheels.

BACKGROUND OF THE INVENTION

Industrial vehicles that are required to have a high degree of maneuverability frequently utilize multi-mode steering systems in which the front and rear wheels of the vehicle are separately controlled. Christensen, U.S. Pat. No. 4,175,638, the disclosure of which is incorporated herein by reference, describes a steering system in which a control senses the positions of the steerable front wheels and produces corresponding control signals. A switch is used to select the desired mode of operation, and the steerable rear wheels are positioned in response to the signal resulting from the turning movement of the front wheels.

Kroning et al., U.S. Pat. No. 5,194,851, the disclosure of which is incorporated herein by reference, describes a controller for a vehicle with a first and second set of wheels that includes a computing section containing reference data, a visual display coupled to the computing section that displays a signal representing an operational mode, and a quasi-analog visual indicator, which is also coupled to the computing section, that indicates the extent of angular displacement of the first set of wheels from center The visual display and indicator are depicted as a gauge on the vehicle dashboard.

Laurich-Trost, U.S. Pat. No. 4,893,689, the disclosure of which is incorporated herein by reference, describes a multi-mode steering control system for a vehicle with independent front and rear wheel steering. The reference further describes LED numerical displays on the vehicle dashboard that represent the orientation of the front and rear wheels.

Some forklift trucks designed for use in narrow aisles of warehouses utilize only three wheels, including a single steerable drive wheel located beneath the body of the truck. Finger, U.S. Pat. No. 4,728,923, the disclosures of which are incorporated herein by reference, describes a wheel direction indicator for a steerable wheel that includes a potentiometer mechanically coupled to the wheel and a multiple voltage threshold detection circuit connected to an array of lamps, located on the vehicle dashboard, for indicating the direction of travel.

An especially maneuverable type of forklift truck that can move sideways down a warehouse aisle employs a single steerable drive wheel, which is generally controlled by a steering wheel and is located at the rear of the vehicle, and a non-steerable but directionally adjustable caster, which is generally located at the front. The adjustable caster and a second, freely rotatable caster that is also located at the front of the vehicle, bear the load of the forks. The operator needs to know the positions of the drive wheel and adjustable caster in order to know and control the direction of vehicle travel; however, because both the drive wheel and the adjustable caster are located beneath the vehicle, the operator cannot directly view the directional position of either wheel. If the vehicle is operated while the drive wheel and adjustable caster are improperly positioned with respect to one another, severe scrubbing or abrasion of the wheels and overburdening of the traction motor may result. Thus, it would be highly desirable if the operator were able to ascertain the direction of the steerable and non-steerable wheels while operating the vehicle and adjust their positions as necessary to avoid damage. It would also be desirable to have provision for stopping the traction of the vehicle when the direction of the drive wheel falls outside its allowable range for the selected steering mode. The present invention achieves these beneficial results.

SUMMARY OF THE INVENTION

In accordance with the invention, a steerable vehicle having front and rear wheels is provided with a visual display for indicating the directional position of the wheels. The visual display, which is transparent, is vertically mounted on the vehicle within the normal forward view of the operator, enabling the operator to simultaneously view the display and maintain an unobstructed forward view. The visual display, which includes a transparent circuit card and an array of light emitting diodes (LEDs), may be mounted on the transparent mast guard of a forklift vehicle. The display is particularly useful with a forklift vehicle having a steerable drive wheel and a directionally adjustable non-steerable caster, both of which are typically situated beneath the vehicle.

Also in accordance with the invention, a steering controller for a wheeled vehicle having a steerable drive wheel includes a computer containing reference data for the allowable range of the directional position of the drive wheel relative to the position of a second wheel, a switch coupled to the computer for selecting the directional position of the second wheel, and a transparent visual display coupled to the computer for indicating the position of the wheels. The display, which includes a transparent circuit card and an LED array, is vertically mounted on the vehicle within the operator's normal forward field of view. The controller provides for a visual signal and, optionally, an audible signal to the operator when the directional position of the drive wheel approaches the limit of its allowable range and further provides for vehicle traction to cease when the position of the drive wheel transgresses its allowable range.

DETAILED DESCRIPTION OF THE INVENTION

The present invention provides a transparent visual display indicating the position of the wheels of a vehicle such as a forklift truck; the display is vertically mounted on the vehicle within the normal forward field of view of the operator, which enables the operator to view the display while maintaining an unobstructed forward view. Previously disclosed displays have been mounted on the vehicle dashboard, requiring the operator to look down and away from the normal view of vehicle operation.

Figure 1:
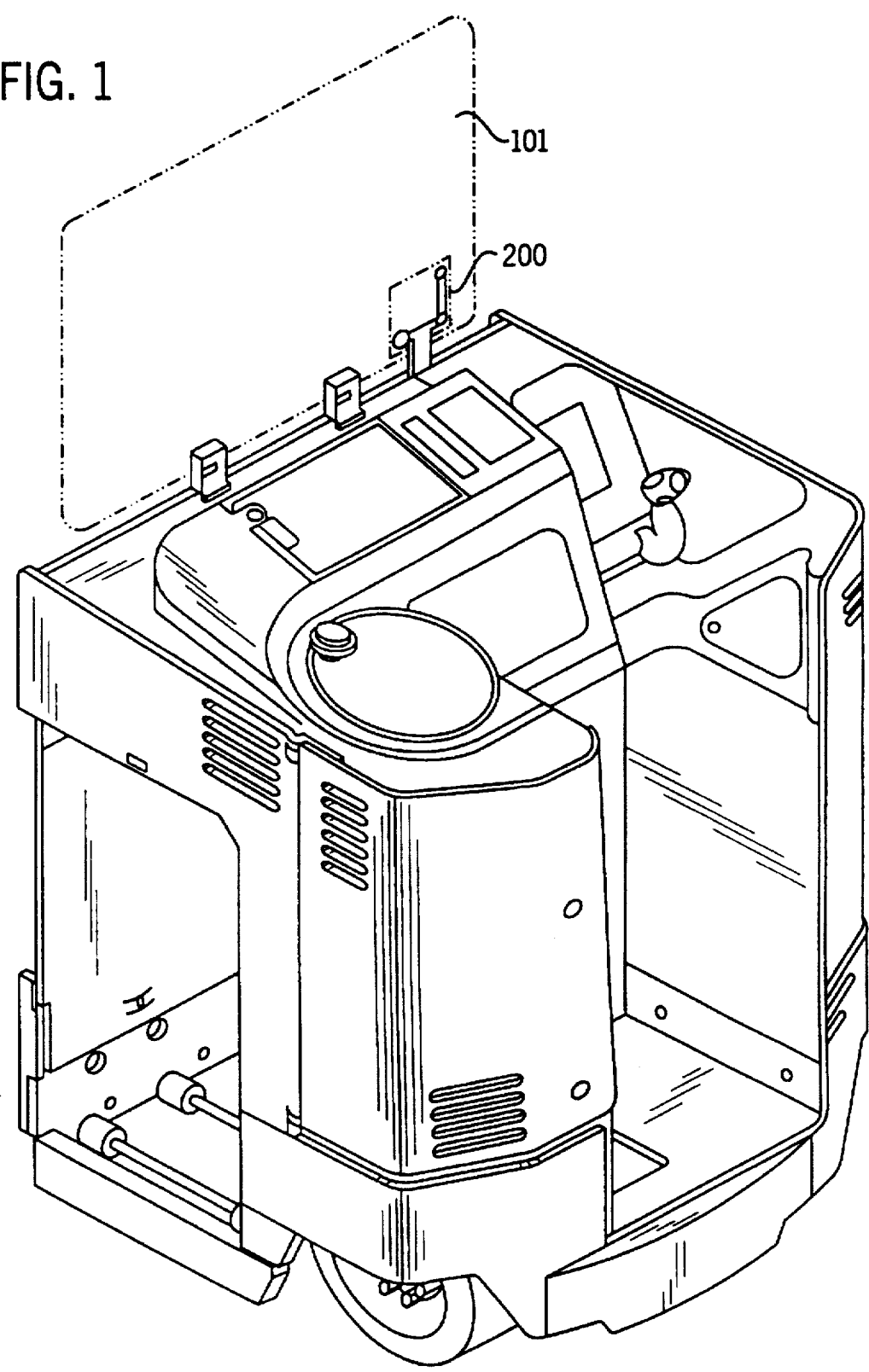
FIG. 1 is a perspective drawing of the clear visual display horizontally mounted on a vehicle.

In FIG. 1 is shown a truck 100, with a transparent visual display 200 affixed to the vertical mast guard 101. This positioning of the display within the operator's normal forward field of vision obviates the need for distracting head movement by the operator during vehicle operation. This location for the display also provides for convenient operation of the membrane switch when a change in the adjustable caster position is required.

The visual display 200 may conveniently take the form of a laminatable decal containing the transparent circuit card, LED arrays, and caster adjustment switch, which are coupled to a computing means (represented as 711 in FIG. 7), preferably a microprocessor within the vehicle. Also, as shown in FIG. 2, the decal may include an etched silhouette of the vehicle indicating the position of the controllable wheels.

Figure 2:
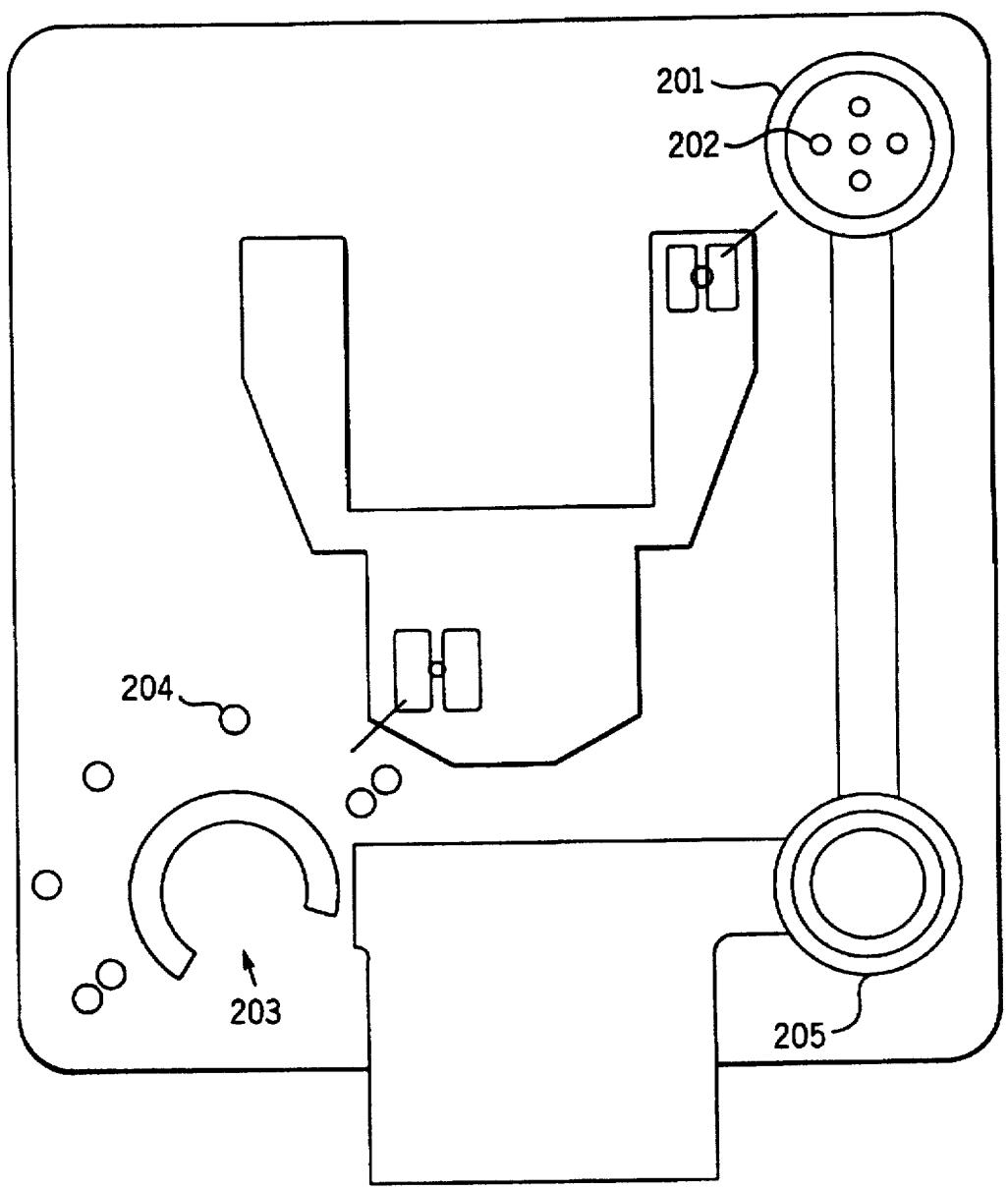
FIG. 2 is a schematic representation of the clear visual display indicating wheel position.
Figure 7:
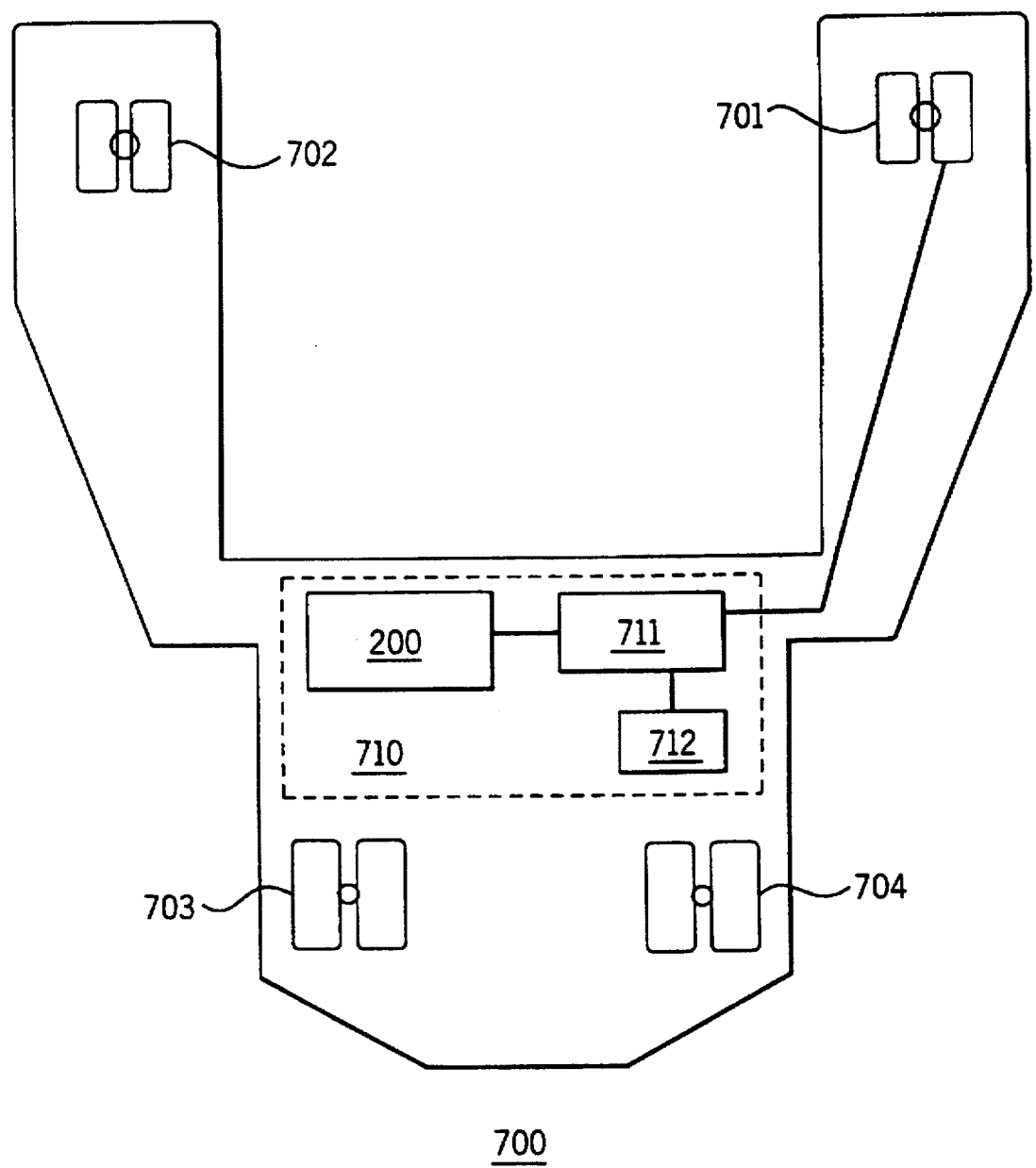
FIG. 7 is a schematic representation of a vehicle provided with the steering controller of the invention.

FIG. 2 depicts the transparent visual display 200 for a vehicle having a non-steerable but adjustable front caster (represented as 701 in FIG. 7) and a steerable rear drive wheel (703 in FIG. 7). The vehicle is also equipped with a second, freely rotatable front caster (702 in FIG. 7) and a freely rotatable rear idler wheel (704 in FIG. 7), whose direction of travel will, of course, follow that of the adjustable caster 701 and drive wheel 703, respectively. The display 200 in FIG. 2 includes a transparent circuit card and an array 201 of LEDs 202 for indicating the directional position of the adjustable non-steerable caster and an array 203 of LEDs 204 for indicating the position of the steerable drive wheel. Also included in the depicted embodiment of the display is a membrane switch 205 that provides for rotation of the adjustable caster from a first position to a second position orthogonal to the first.

Figure 3:
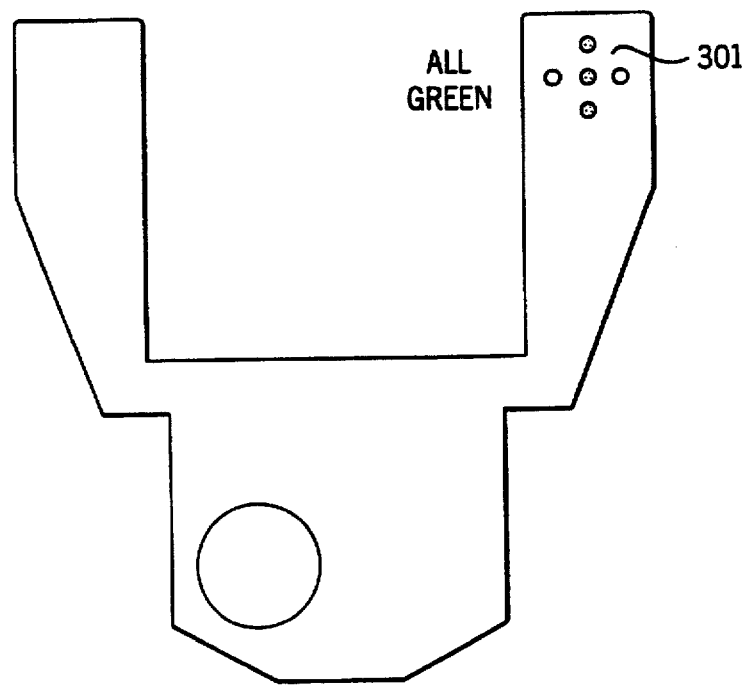
FIGS. 3 and 4 are schematic representations of portions of the visual display indicating the positions of the adjustable caster and steerable drive wheel, respectively, of a vehicle in a forward-backward travel mode.
Figure 4:
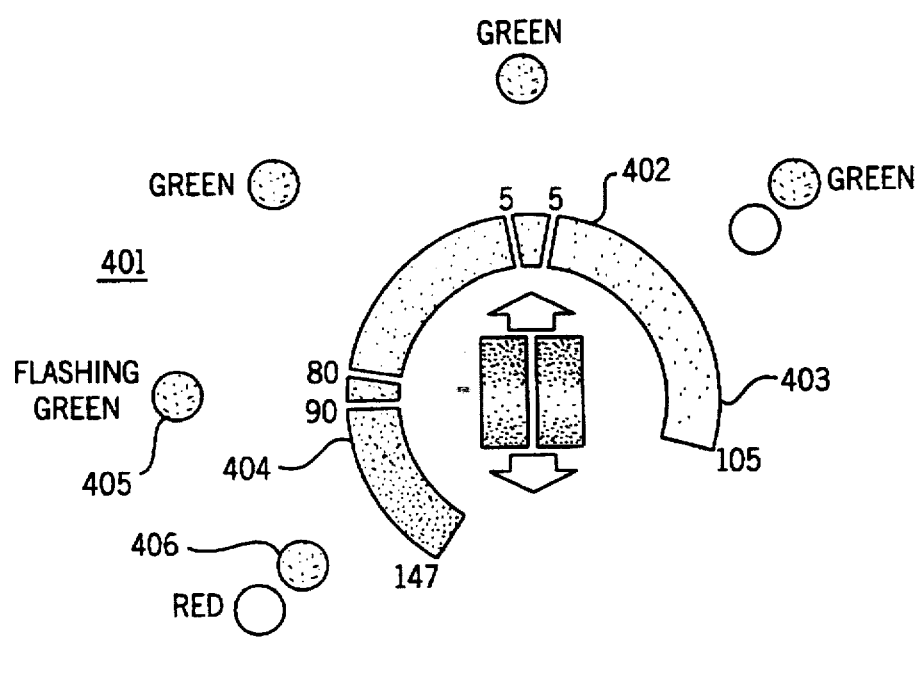

FIGS. 3 and 4 schematically represent portions of an embodiment of the visual display 200 indicating the position of the adjustable caster and the steerable drive wheel, respectively, when the vehicle is in the forward-backward travel mode. The LED array 301 of FIG. 3, depicting a vertical alignment of three LEDs, shown as green lights, indicates that the directional position of the adjustable caster is parallel to the direction of forward-backward travel. The LED array 401, shown as including both green and red LEDs, is arranged around the arc 402, which represents the range of directional position of the steerable drive wheel and comprises about 252 degrees. Arc 402 is divided into two segments, arc 403 and arc 404. Arc 403, the shaded portion of arc 402, comprises about 195 degrees and represents the allowable range of directional position of the drive wheel when the vehicle is in the forward-backward travel mode. Arc 404, the blackened segment of arc 402, represents a range of drive wheel direction that would lead to excess abrasion of the wheels and stress of the traction motor. The steering controller provides that the vehicle will not travel if started with the drive wheel out of the allowable position range.

If, during operation of the vehicle in the forward-backward travel mode, the position of the drive wheel approaches the limit of its allowable range, the green LED 405 flashes; optionally, an audible alarm may also be activated. If the drive wheel continues beyond the allowable range limit, a signal to the microprocessor causes activation of the red LED 406 and loss of voltage to the traction motor, resulting in cessation of vehicle traction. Optionally, an alarm may also sound. To restore traction, the vehicle must be stopped and the drive wheel returned to a position within its allowable range for forward-backward travel. Alternatively, the switch 205 (FIG. 2) may be activated to rotate the adjustable caster 90 degrees, signalling the microprocessor to allow the vehicle, now in the side-to-side mode, to resume travel.

Figure 5:
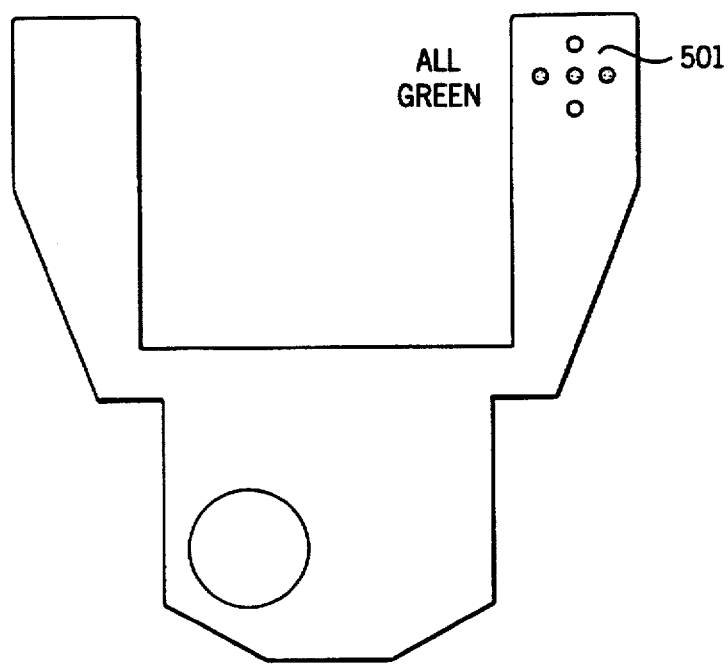
FIGS. 5 and 6 are schematic representations of portions of the visual display indicating the positions of the adjustable caster and steerable wheel, respectively, of a vehicle in side-to-side travel mode.
Figure 6:
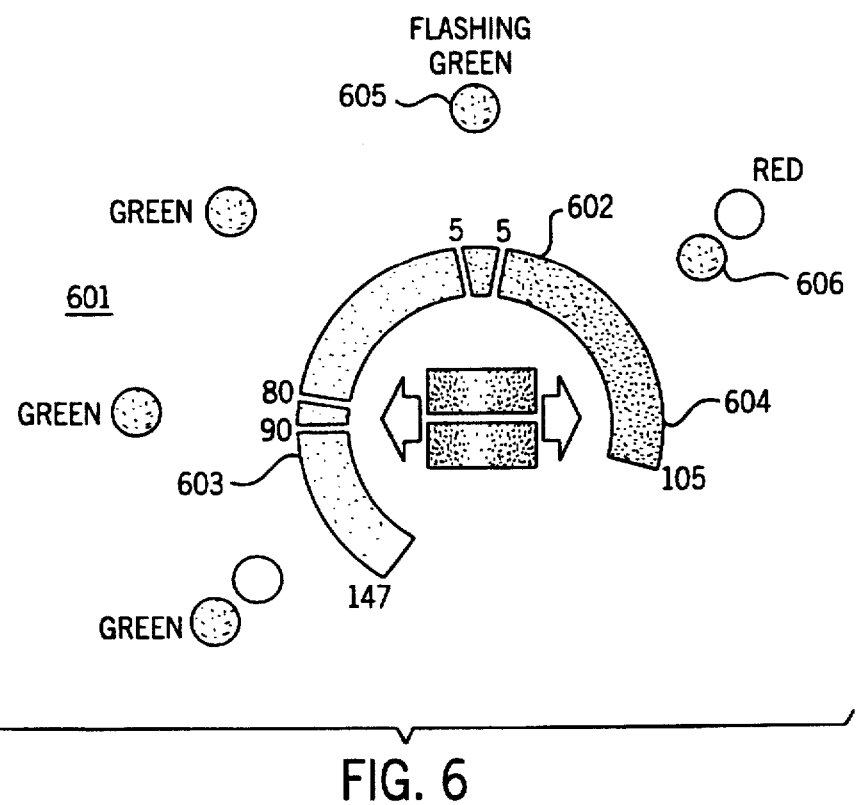

In FIGS. 5 and 6 are schematically shown portions of the same embodiment of the visual display depicted in FIGS. 3 and 4; now, however, the vehicle is in the side-to-side travel mode. The LED array 501 of FIG. 5 shows a horizontal alignment of three lighted green LEDs, indicating that the steerable caster in the second of its positions, which is orthogonal to that represented by array 301 in FIG. 3. The LED array 601 of green and red LEDs is arranged around arc 602, which comprises about 252 degrees and corresponds to arc 402 of FIG. 4. Arc 603, the shaded segment of arc 602, comprises about 152 degrees and represents the allowable range of directional position of the drive wheel when the vehicle is in the side-to-side travel mode. Arc 604, the blackened portion of arc 602, shows the range of drive wheel direction that would cause skidding of the non-steerable caster and strain on the traction motor. If the vehicle were started in the side-to-side travel mode with the drive wheel in this range, it would not move.

If the vehicle is being operated in the side-to-side travel mode and the drive wheel approaches a position at the limit of its allowable range, the green LED 605 flashes, optionally accompanied by an audible alarm. Continuing to turn the drive wheel beyond the allowable range causes the red LED 606 to light and vehicle traction to cease; an alarm may also sound. After the vehicle has stopped, traction may be restored by turning the drive wheel to a position out of the restricted range and into the allowable range for side- to-side travel; alternatively, the caster rotation switch 205 may be activated to put the vehicle in the forward-backward travel mode.

FIG. 7 is a schematic representation of a vehicle 700 provided with a steering controller 710 in accordance with the present invention. Vehicle 700 is represented by a planar silhouette within which is indicated the placement of the non-steerable but adjustable load-bearing caster 701 (shown in the forward-backward travel mode), the freely rotatable load-bearing caster 702, the steerable drive wheel 703, and the freely rotatable idler wheel 704. The steering controller 710 comprises computing means 711, preferably a microprocessor located within the vehicle, switch means 712 for selecting the position of the adjustable caster 701, and a transparent visual display 200 (represented in detail in FIG. 2), that indicates the directional position of caster 701 and drive wheel 703. As indicated in FIG. 7, computing means 711, which contains reference data for the allowable range of the directional position of the steerable drive wheel 703 relative to the directional position of the adjustable caster 701, is coupled to caster 701 and drive wheel 703 and also to switch means 712, transparent visual display 200, and an audible signal means, preferably in the form of a speaker 800. Switch means 712 may, as previously discussed, be included as a membrane switch 205 (FIG. 2) in visual display 200.

Thus, the present invention enables the operator of a vehicle to ascertain the position of the vehicle wheels by viewing a visual display advantageously situated within the operator's forward field of view, avoiding the inconvenience and distraction of operator eye movement away from the normal field of view. Also provided by the invention is a warning to the operator of impending reduction of traction and control as well as provision for shutdown of vehicle traction to avoid damage.

The invention has been described in detail for the purpose of illustration, but it is understood that such detail is solely for that purpose, and variations can be made therein by those skilled in the art without departing from the spirit and scope of the invention that is defined by the following claims.

What is claimed is:

1. In combination, a steerable wheeled vehicle having front and rear wheels and a visual display for indicating the directional position of said wheels,
   wherein said display is transparent and vertically mounted on said vehicle within the normal forward field of view of the vehicle operator, thereby enabling the operator to simultaneously view said display and maintain an unobstructed forward view.

2. The combination of claim 1 wherein said vehicle is a material-handling forklift vehicle having a transparent mast guard and said visual display is mounted on said mast guard.

3. The combination of claim 1 wherein said visual display comprises a transparent circuit card and a plurality of light emitting diodes (LEDs).

4. The combination of claim 3, wherein said LEDs comprise at least one array indicating the directional position of said wheels.

5. The combination of claim 4 wherein said LEDs comprise a first array indicating the directional position of said steerable drive wheel and a second array indicating the directional position of said adjustable non-steerable caster.

6. The combination of claim 4 further comprising means for pulsed operation of said LEDs.

7. The combination of claim 3 wherein said visual display further comprises a switch for adjusting the directional position of one or more of said wheels.

8. The combination of claim 2 wherein said forklift vehicle has a steerable drive wheel and a directionally adjustable non-steerable caster.

9. The combination of claim 8 wherein said directionally adjustable non-steerable caster is a front wheel and said drive wheel is a rear wheel of said vehicle, and the directional position of said steerable drive wheel has an allowable range as a function of the directional position of said non-steerable caster.

10. The combination of claim 9 wherein said non-steerable caster is adjustable to two directional positions, a first position parallel to the forward-backward direction of travel of said vehicle, and a second position orthogonal to said first directional position.

11. The combination of claim 10 wherein the directional position of said steerable drive wheel comprises an arc of about 255 degrees.

12. The combination of claim 11 wherein, when said non-steerable caster is adjusted to said first position, the allowable range of the directional position of said drive wheel comprises an arc of about 195 degrees.

13. The combination of claim 11 wherein, when said non-steerable caster is adjusted to said second position, the allowable range of the directional position of said drive wheel comprises an arc of about 155 degrees.

14. A steering controller for a steerable wheeled vehicle having front and rear wheels, one of said wheels being a steerable drive wheel, said controller controlling the directional position of said drive wheel as a function of the directional position of a second of said wheels and comprising:

computing means including reference data for an allowable range of the directional position of said drive wheel as a function of the directional position of said second of said wheels;

switch means for selecting the directional position of said second of said wheels, said switch means being coupled to said computer means; and a transparent visual display coupled to said computing means and indicating the directional position of said wheels, said visual display being vertically mounted on said vehicle within the normal forward field of view of the vehicle operator, thereby enabling the operator to simultaneously view said display and maintain an unobstructed forward view;

whereby said steering controller provides for a visual signal to said operator as the directional position of said drive wheel approaches the limit of its allowable range and further provides for cessation of traction of said vehicle when the directional position of said drive wheel transgresses its allowable range.

15. The steering controller of claim 14 wherein said second wheel is a directionally adjustable non-steerable caster.

16. The steering controller of claim 15 wherein said directionally adjustable non-steerable caster is a front wheel and said drive wheel is a rear wheel of said vehicle.

17. The steering controller of claim 16 wherein said non-steerable caster is adjustable to two directional positions, a first position parallel to the forward-backward direction of travel of said vehicle, and a second position orthogonal to said first directional position.

18. The steering controller of claim 17 wherein the directional position of said steerable drive wheel has a range comprising an arc of about 255 degrees.

19. The steering controller of claim 18 wherein, when said non-steerable caster is adjusted to said first position, the allowable range of the directional position of said drive wheel comprises an arc of about 195 degrees.

20. The steering controller of claim 18 wherein, when said non-steerable caster is adjusted to said second position, the allowable range of the directional position of said drive wheel comprises an arc of about 155 degrees.

21. The steering controller of claim 14 where said computing means comprises a microprocessor.

22. The steering controller of claim 14 wherein said visual display comprises a transparent circuit card and a plurality of light emitting diodes (LEDs).

23. The steering controller of claim 22 wherein said LEDs comprise a first array indicating the directional position of said steerable drive wheel and a second array indicating the directional position of said adjustable non-steerable caster.

24. The steering controller of claim 22 wherein said visual display further comprises a membrane switch for adjusting the directional position of said non-steerable caster.

25. The steering controller of claim 14 further comprising audible signal means.

26. A steerable wheeled forklift vehicle comprising:
   a steerable rear drive wheel;
   a directionally adjustable non-steerable front caster; and
   a steering controller for controlling the directional position of said steerable drive wheel as a function of the directional position of said non-steerable caster, said steering controller comprising;

a computer including reference data for an allowable range of the directional position of said steerable drive wheel as a function of the directional position of said non-steerable caster;

a switch for selecting the directional position of said non-steerable caster, said switch being coupled to said computer; and a transparent visual display for indication of the directional position of said steerable drive wheel and said non-steerable caster, said visual display being coupled to said computer and comprising a transparent circuit card and an array of light emitting diodes (LEDs), said visual display being vertically mounted on said vehicle within the normal forward view of the vehicle operator, thereby enabling the operator to simultaneously view said display and maintain an unobstructed forward view;

whereby said steering controller provides for a visual signal to said operator as the directional position of said steerable drive wheel approaches the limit of its allowable range and further provides for cessation of traction of said vehicle when the directional position of said drive wheel transgresses its allowable range.

27. The forklift vehicle of claim 26 wherein said visual display further comprises a switch for adjusting the directional position of said non-steerable caster.

* * * * *